Feb. 20, 1968 A. LINDBERG 3,370,185
SEMICONDUCTOR DEVICE FOR DEMONSTRATING THE HALL EFFECT
Filed Sept. 24, 1963
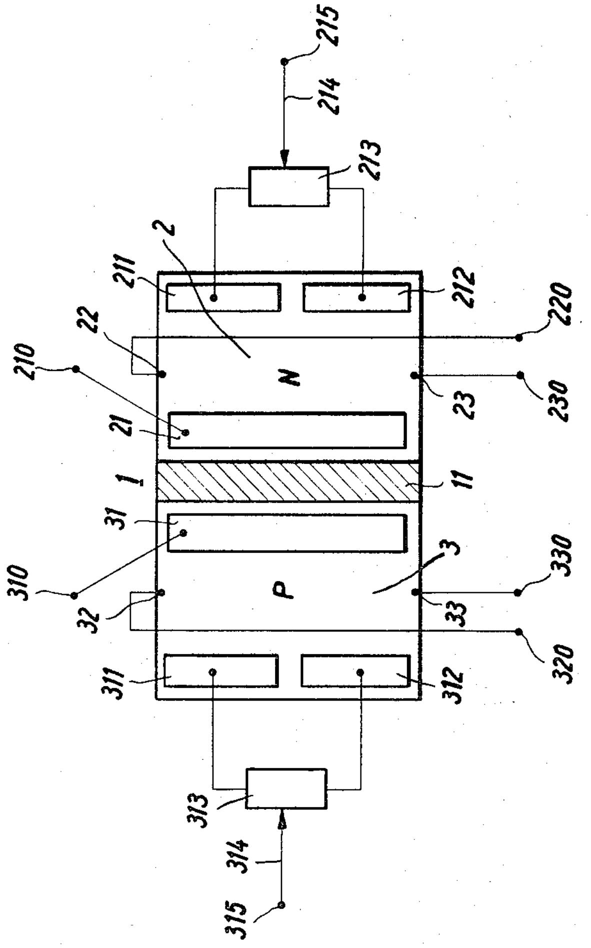
INVENTOR
Albert Lindberg
BY Spencer & Kaye
ATTORNEYS United States Patent Office 3,370,185

Patented Feb. 20, 1968

3,370,185

SEMICONDUCTOR DEVICE FOR DEMONSTRATING THE HALL EFFECT

Albert Lindberg, Cologne-Marienburg, Germany, assignor, by mesne assignments, to Leybold Holding A. G., Zug, Switzerland.

Filed Sept. 24, 1963, Ser. No. 311,168
Claims priority, application Germany, Sept. 25, 1962, L 43,041
10 Claims. (Cl. 307—309)

The present invention relates generally to the semiconductor art, and, more particularly, to a semiconductor arrangement used for demonstration purposes, in which the conductivity type is determined by measuring the Hall effect, as a result of which the function of a crystal diode or a crystal triode (transistor) can be clearly recognized.

The electric conductivity processes in semiconductors are a leading topic among physicists and constitute a significant portion of the electronic arts. For a number of years efforts have been made to demonstrate for educational purposes the most important technical applications of the semiconductor, namely, the transistor. In the meanwhile, different types of switching arrangements involving the use of transistors have become known. However, what has been lacking up to now is a manner of rendering comprehensible the important physical processes involved in the operation of a crystal diode or triode (transistor).

It is, therefore, the object of the present invention to provide an arrangement by means of which the processes and functions of semiconductors can be demonstrated.

Another object is to provide an arrangement of the character described wherein difficulties due to space limitations are eliminated.

These objects and others ancillary thereto are accomplished in accordance with preferred embodiments of the present invention wherein a plate body or slab is provided with two adjacent plate halves or sections each of which is, by itself, uniform. The plate sections, however, are of the opposite conductivity type, and are provided with take-off or pick-up electrodes for a Hall voltage and lead-in or feed electrodes for the transverse current. One of the two plate halves thus should be, for example, p-conductive and the other n-conductive. Along the line of separation there is the pn-junction which, as a continuous transition from p-conductive to n-conductive condition, can not in itself be uniform.

Each of the two individual plate halves are homogeneous and should be so provided with suitable contact connections that the conductivity type can be determined by measuring the Hall effect. One contact connection of each plate half should lie so close to the pn-junction that it, together with the corresponding contact of the other side can be used for examining the pn-junction itself.

If an areal current-conductive region is contacted with pick-up electrodes for a Hall voltage, it is customary to divide one of the two electrodes or contacts into two sections, between which, with the aid of a potentiometer connected thereto, the electrical point of symmetry for the other Hall electrode lies. The known arrangement produces a number of difficulties when the described semiconductor element is contacted, these difficulties being due to spatial reasons.

The available space on each of the plate halves, both for economic and technical reasons, is so limited that the two contacts which are separated from each other, cannot be applied without difficulty. Also, the contacting must be so arranged that no movable potentiometer contact lies in the Hall voltage circuit. According to a further feature of the present invention, therefore, the feed electrode for the transverse current which is remote from the pn-junction is divided into two sections between which a potentiometer is connected. The transverse or cross current is fed while the tap and the Hall electrodes are rendered symmetrical by changing the cross current distribution within the semiconductor element. This feature is exceptionally effective when the potentiometer is properly designed and also has the advantage that, due to the lack of any movable potentiometer contacts, no disturbing changing contact or thermal voltages can arise. It may further be expedient to introduce new electric charge carriers into the pn-junction which is biased to be in blocking condition, particularly by illuminating the pn-junction. For this purpose, the arrangement is such that the transition zone between the two feed electrodes for the cross current which lies closest to the transition zone is accessible for optical examination.

Additional objects and advantages of the present invention will become apparent upon consideration of the following description when taken in conjunction with the accompanying drawings in which:

The figure is a schematic illustration of a semiconductor demonstrator arrangement according to the present invention.

With more particular reference now to the drawing, a semiconductor arrangement 1 is provided, comprising two adjacent plate halves or slab sections 2, 3, each of which is uniform or homogeneous within itself and these plate halves are separated by a transition zone or pn-junction 11. Attached to the plate halves are divided lead-in or feed electrodes 211, 212 and 311, 312 for the cross current, as well sa electrodes 21, 31 with contact connections 210, 310, the electrodes 21, 31 lying opposite the lead-in electrodes. Arranged between the divided lead-in electrodes 211, 212, and 311, 312, are potentiometers 213, 313, with slide taps 214, 314 and contact connections 215, 315. Each plate half 2, 3 additionally has two pick-up electrodes 22, 23 and 32, 33, for the Hall voltage with contact connections 220, 230 and 320, 330. The pn-junction 11 can be illuminated by means of a suitable device.

The semiconductor arrangement 1 can, according to a further feature of the present invention, be made of a semiconductor monocrystal, which, during its manufacture, has had its conductivity type changed. Preferably, the semiconductor is constituted by a germanium monocrystal whose doping for both conductivity types is so high that the surface effect for the total current flow within the pn-junction is of but minor significance.

The semiconductor arrangement according to the present invention is used as follows for teaching purposes: First it is shown that the two plate halves have a Hall effect with different algebraic signs. This means that on the one side there must be a p-conductive mass and on the other an n-conductive mass. From this it can be derived that the concentration of charge carriers of the two carrier types goes, in the region of the pn-junction 11, from full constant value pretty suddenly to zero. Such a charge carrier distribution must react to an applied electric field in dependence upon the algebraic sign. If the two charge carrier regions are moved toward each other by the applied electric field, no noticeable effect is observed. As soon as the two concentration flanks have completely penetrated each other, due to the applied field, a homogeneous high electric conductivity of the arrangement will be observed. If, however, the two carrier clouds are driven away from each other by the applied field, a region is produced between the two which has been rendered poor in carriers and which is electrically insulating. The entire arrangement becomes, roughly stated, an insulator. In this way, the physical function of a crystal diode or a semiconductor rectifier is made understandable.

If, now, new electric charge carriers are brought into the pn-junction 11, which is biased into blocking condition, the insulating condition has to go over again into conducitve condition. As suggested, these charge carriers might be produced by illuminating the pn-junction 11. It has been found that, in this way, one can obtain a multiple of the weak current which flows even in reverse direction. In the case of the transistor, these charge carriers in the region which is poor in carriers are not produced photoelectically but by diffusing the charge carriers in from adjacent electrically conductive regions. This last-mentioned effect can not be represented with the described arrangement. However, all that is necessary to make this matter understandable to a physicist is that the charge carriers be introduced in any suitable manner.

It will be understood that the above description of the present invention is susceptible to various modifications, changes and adaptations, and the same are intended to be comprehended within the meaning and range of equivalents of the appended claims.

What is claimed is:

1. A semiconductor device, comprising, in combination: a semiconductor slab having two homogeneous sections of different type conductivity and defining a pn-junction therebetween; and Hall voltage pick-up electrodes and transverse current feeding electrodes disposed on each of the sections.

2. A device as defined in claim 1 wherein there is a transverse current feeding electrode remote from said pn-junction and which is divided into two separate electrode elements, a potentiometer connected between said electrode elements and having a slide via which the cross current is fed to render the Hall electrodes symmertical by changing the transverse current distribution within the semiconductor.

3. A device as defined in claim 1 wherein the slab is a semiconductor monocrystal originally of one conductivity type and a portion of which had its conductivity type changed during manufacture of the device.

4. A device as defined in claim 1 wherein the slab sections consist of germanium having a large amount of doping for both conductivity types so that the surface effect for the total cross current within the pn-junction is of but negligible significance.

5. A semiconductor device, comprising, in combination: a semiconductor slab having two homogeneous sections of different conductivity type defining a pn-junction between them; two transverse current feeding electrode means disposed on each section, one at a place remote from said junction and the other near said junction; and Hall voltage pick-up electrode means on each section between said current feeding means.

6. A device as defined in claim 5 wherein the current feeding electrode means which are disposed near said pn-junction are very closely adjacent the pn-junction.

7. A device as defined in claim 5 wherein the current feeding electrode means near the pn-junction provide a free space to permit for optical observation.

8. A device as defined in claim 5 wherein the sections are of substantially the same size.

9. A device as defined in claim 5 wherein the transverse current feeding electrode means remote from said junction each is divided into two separate electrode elements and further comprising a potentiometer connected between said electrode elements and having a slide via which the transverse current is fed to render the Hall electrode means electrically symmetrical by changing the transverse current distribution within the semiconductor slab.

10. A device as defined in claim 9 wherein said Hall voltage pick-up electrode means on each section include two electrode elements, one on each side of its section.

References Cited

UNITED STATES PATENTS

| | | | |
|---|---|---|---|
| 2,736,822 | 2/1956 | Dunlap | 317—235 |
| 2,877,309 | 3/1959 | Henisch | 317—234 |
| 3,036,234 | 5/1962 | Dacey | 317—235 |
| 3,094,669 | 6/1963 | Gebhardt et al. | 307—88.5 |

FOREIGN PATENTS

| | | |
|---|---|---|
| 1,077,185 | 11/1954 | France. |
| 822,210 | 10/1959 | Great Britain. |

JOHN W. HUCKERT, *Primary Examiner.*

J. D. CRAIG, M. H. EDLOW, *Assistant Examiners.*